United States Patent
Welch (10) Patent No.: US 10,662,578 B2
(45) Date of Patent: May 26, 2020

(54) LAUNDRY MANAGEMENT DEVICES, SYSTEMS, AND METHODS

(71) Applicant: Casey B. Welch, DPO, AA (US)

(72) Inventor: Casey B. Welch, DPO, AA (US)

(73) Assignee: Casey B. Welsh, DPO, AA (US)

( * ) Notice: Subject to any disclaimer, the term of this patent is extended or adjusted under 35 U.S.C. 154(b) by 393 days.

(21) Appl. No.: 15/492,984

(22) Filed: Apr. 20, 2017

(65) Prior Publication Data

US 2018/0305856 A1    Oct. 25, 2018

(51) Int. Cl.
| | | |
|---|---|---|
| G06Q 40/00 | (2012.01) | |
| D06F 95/00 | (2006.01) | |
| G06Q 30/02 | (2012.01) | |
| G06Q 20/18 | (2012.01) | |
| G07F 17/20 | (2006.01) | |
| D06F 39/14 | (2006.01) | |

(52) U.S. Cl.
CPC ............. *D06F 95/00* (2013.01); *G06Q 20/18* (2013.01); *G06Q 30/0283* (2013.01); *G07F 17/20* (2013.01); *D06F 39/14* (2013.01)

(58) Field of Classification Search
CPC ....... H04L 2012/2841; H04L 2012/285; H04L 12/282
See application file for complete search history.

(56) References Cited

U.S. PATENT DOCUMENTS

| | | | | |
|---|---|---|---|---|
| 4,084,237 A | * | 4/1978 | Beachem | G05B 19/106 134/58 R |
| 4,120,013 A | * | 10/1978 | Simmons | D06F 37/42 361/180 |
| 2005/0132759 A1 | * | 6/2005 | Guinibert | D06F 58/04 68/24 |
| 2008/0281664 A1 | * | 11/2008 | Campbell | G06Q 10/02 705/5 |
| 2012/0143708 A1 | * | 6/2012 | Viviano | G06Q 20/18 705/24 |
| 2014/0250019 A1 | * | 9/2014 | Causey | G06Q 30/0645 705/307 |
| 2017/0085390 A1 | * | 3/2017 | Belveal | H04L 12/2818 |

OTHER PUBLICATIONS

Spin Laundry Lounge (Spin Laundry Lounge, https://web.archive.org/web/20150119205833/http://www.spinlaundrylounge.com/laundromat, p. 4, Jan. 19, 2015) (Year: 2015).*

* cited by examiner

*Primary Examiner* — Bruce I Ebersman
*Assistant Examiner* — Mark H Gaw
(74) *Attorney, Agent, or Firm* — Snell & Wilmer L.L.P.

(57) ABSTRACT

A laundry management system may comprise a user interface in communication with a controller. The controller may be configured to at least one of actuate a laundry machine lock in response to receiving a first identifier associated with a user from the user interface, and command sending of a message to a remote communication device associated with the user.

4 Claims, 4 Drawing Sheets

LAUNDRY MANAGEMENT DEVICES, SYSTEMS, AND METHODS

FIELD

This disclosure relates generally to laundry management devices, systems, and methods. More specifically, this disclosure relates to devices and systems for managing security and use of laundry devices, including washing machines and dryers.

BACKGROUND

Laundry services are commonly offered in a commercial setting, in which multiple washing machines and dryers are available for use to the public or a group of individuals. Similar services may be offered in other settings, such as multi-family housing, dormitories, hotels, or on cruise ships. After laundry is deposited in a machine, the machine may lock until the machine operations have concluded. However, unless machine operations are supervised, the machine user typically cannot prevent a third party from removing laundry from the machine. Moreover, third parties may be prevented from using a machine if a prior user does not promptly remove his laundry upon conclusion of machine operations.

SUMMARY

In various embodiments, a laundry management system may comprise a user interface in communication with a controller. The controller may be configured to at least one of actuate a laundry machine lock in response to receiving an identifier from the user interface, or command sending of a message to a remote communication device.

In various embodiments, a method of using a laundry management system may comprise receiving, by a controller, a first identifier associated with a user through a user interface; and storing the identifier in a tangible, non-transitory memory configured to communicate with the controller. The method may further comprise actuating, by the controller, a laundry machine lock to a locked position, which may be in response to receiving the first identifier. The method may further comprise receiving, by the controller, a second identifier associated with the user through the user interface; and actuating, by the controller, the laundry machine lock to an unlocked position in response to the receiving the second identifier and the second identifier matching the first identifier.

In various embodiments, a method of using a laundry management system may comprise receiving, by a controller, a first identifier associated with a remote communication device through a user interface; detecting, by the controller and via a sensor, an operational state of a laundry machine; and/or commanding, by the controller, sending of a first message to the remote communication device through a remote messaging device advising of the operational state.

In various embodiments, a method for presenting operational state information of laundry machines may comprise detecting, by a first sensor, a first operational state of a first laundry machine; and producing, by a first controller, first operational information indicating that the first operational state of the first laundry machine is available. The method may further comprise detecting, by a second sensor, a second operational state of a second laundry machine; and producing, by a second controller, second operational information indicating that the second operational state of the second laundry machine is cycling. The method may further comprise transmitting, by the controller, the first operational information and second operational information to a main server; and causing, by the main server, the display of the first operational information and the second operational information for viewing.

BRIEF DESCRIPTION OF THE DRAWING FIGURES

A more complete understanding of this disclosure may be derived by referring to the detailed description and claims when considered in connection with the drawing figures, wherein like reference numbers refer to similar elements throughout the drawing figures, and:

DETAILED DESCRIPTION

Reference will now be made to the example embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention. Also, any reference to "attached," "fixed," "connected," "coupled" or the like may include permanent, removable, temporary, partial, full and/or any other possible attachment option.

For the sake of brevity, conventional techniques for laundry management devices, systems, and methods may not be described in detail herein. Furthermore, the connecting lines shown in various figures contained herein are intended to represent example functional relationships, electrical connections, and/or physical couplings between various elements. It should be noted that many alternative or additional functional relationships, electrical connections, or physical connections may be present in a laundry machine and/or management device, or systems and methods for using the same.

Devices, systems, and methods described herein may increase the security and efficiency of laundry machines, such as washing machines and dryers, which are operated in a commercial or multi-user setting. By way of explanation, laundry machines are regularly operated in multi-user settings including commercial laundry facilities, multi-family housing, laundromats, dormitories, hotels, cruise ships, or the like. Laundry cycle times vary, but may exceed ninety minutes or more, and users may not wish to monitor their laundry during this time. Typically, laundry machines automatically unlock after a cycle ends. As a result, if a user's laundry is left unmonitored or is not removed promptly from the laundry machine after a cycle ends, third parties may have the opportunity to handle, misappropriate, and/or damage a user's laundry.

Moreover, laundry machines are often subject to high frequency use in multi-user settings. During peak use times, minimizing the duration between laundry cycles increases machine use efficiency and, therefore, may improve user satisfaction and/or profitability. Typical laundry machines may include a visual or audible indicator, but may not otherwise communicate the end of a laundry cycle. As a result, users who are not in close proximity to a machine may not promptly remove laundry, potentially increasing the duration between laundry cycles.

Accordingly, devices and systems for securing laundry and increasing machine use efficiency are desirable. Moreover, such devices and systems may be retrofit on existing laundry machines to increase cost efficiency and decrease time and expense of modifications. Such efficiency and security considerations are addressed herein by providing laundry management systems, devices, and methods configured to communicate with an identified user, to incentivize timely removal of laundry, and/or to restrict machine access to an identified user.

More specifically, in various embodiments, a laundry management system may comprise a user interface in communication with a controller. In various embodiments, the laundry management system is configured to selectively unlock the laundry machine in response to input on the user interface of a user's identifier. The user may input an identifier of choice prior to locking the laundry machine and/or initiating a laundry cycle. The identifier may be stored in a tangible, non-transitory memory that is in communication with, or integral to, the controller. At the completion of the laundry cycle, the laundry machine may remain locked until the user's identifier is again input on the user interface, allowing the user to retrieve his laundered belongings.

Figure 1:
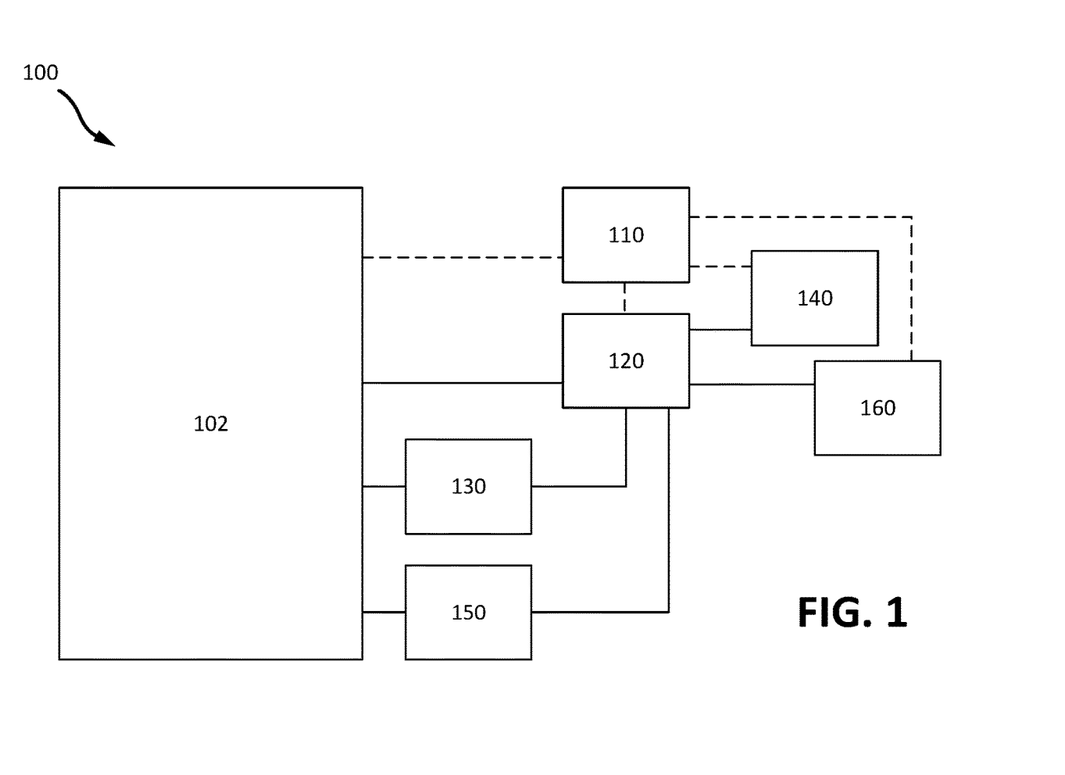
FIG. 1 illustrates a schematic view of an example laundry management system, in accordance with various embodiments.

FIG. 1 illustrates an example laundry management system 100. In accordance with various embodiments, laundry management system 100 may comprise a laundry machine 102 in communication with a user interface 110 and a controller 120. User interface 110 may be in communication with controller 120 and/or laundry machine 102. User interface 110 may further be in communication with payment mechanism 160 and/or remote messaging device 140 (each discussed below). In various embodiments, any component of laundry management system 100 may be in electronic communication with any other component of laundry management system 100.

In various embodiments, user interface 110 may comprise an interface through which controller 120 may display information to a user and/or through which a user may input information, such as an identifier associated with the user. The identifier may be an identification code, pin number, name, phone number, email address, physical address, biometric information (e.g., fingerprint, face scan, or the like), or any other information associated with the user (or a user's remote communication device) suitable for use in connection with laundry management system 100 and/or to identify the user. A user of laundry machine 102 may input an identifier into user interface 110, and in response to the user desiring to open laundry machine 102 to retrieve the contents (e.g., after a washing cycle), the user may be required to enter the same identifier in order for laundry machine 102 to unlock the door.

In various embodiments, user interface 110 may be integral with laundry machine 102, or a separate device from laundry machine 102. In various embodiments, user interface 110 may be offered on a mobile application in communication with controller 120 on a user's remote communication device, so the user may provide inputs through his or her device. User interface 110 may comprise an analog, digital, or graphical user interface. In various embodiments, user interface 110 comprises a numerical keypad. In various embodiments, user interface 110 comprises an alphanumeric keypad. In various embodiments, user interface 110 comprises a graphical user interface enabled with a touch screen. In various embodiments, user interface 110 comprises an Arduino device. In various embodiments, user interface 110 comprises an instrument reader, for example, to read a card or fob associated with the user, wherein the instrument (e.g., card of fob) provides the identifier associated with the user. However, in various embodiments, user interface 110 may comprise any type of interface suitable for a user to provide inputs into laundry management system 100.

Controller 120 may be in communication with various other elements of laundry management system 100. In various embodiments, controller 120 may be in communication with laundry machine 102 and user interface 110. Controller 120 may further be in communication with at least one of laundry machine lock 130, sensor 150, payment mechanism 160, and/or remote messaging device 140 (each discussed below).

Controller 120 may comprise a processor configured to implement various logical operations in response to execution of instructions, for example, instructions stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory, computer-readable media that were found in In Re Nuijten to fall outside the scope of patentable subject matter under 35 U.S.C. § 101. In various embodiments, the processor may be configured to implement various methods of using a laundry machine device (discussed below). In various embodiments, controller 120 comprises a solid-state programmable logic controller. In various embodiments, controller 120 comprises a shared controller which sends commands to two or more microcontrollers, each of which sends commands to a single laundry machine. However, in various embodiments, controller 120 may comprise any suitable processor configured for use in laundry management system 100.

Laundry machine lock 130 may comprise a locked position and an unlocked position. When laundry machine lock 130 is in the locked position, a user is unable to open a door of the laundry machine. When the laundry machine lock 130 is in the unlocked position, a user is able to open and close the laundry machine door. In various embodiments, laundry machine lock 130 is integral to laundry machine 102. In various embodiments, laundry machine lock 130 comprises a solenoid lock in communication with controller 120. In various embodiments, when in the locked position, laundry machine lock 130 mechanically obstructs a door of the laundry machine from being opened by a user. Controller 120 may be configured to actuate laundry machine lock 130 to move into a locked position in response to receiving payment to use laundry machine 102 by a user, and/or receiving a first identifier associated with the user. Controller 120 may be further configured to actuate laundry machine lock 130 to move into an unlocked position in response to receiving a second identifier and/or receiving an overdue payment, discussed herein, after laundry machine lock 130 has moved into a locked position (e.g., after a cycle has completed, or if the user wants to retrieve the contents of laundry machine 102).

In various embodiments, laundry management system 100 comprises a sensor 150 configured to detect the operational state of the laundry machine. Sensor 150 may be in communication with controller 120 and may provide information to controller 120 to indicate the operational state of laundry machine 102. In various embodiments, sensor 150 is integral to laundry machine 102. In various embodiments, sensor 150 comprises at least one of an accelerometer configured to measure the speed of a laundry machine component such as a drum, a flowmeter configured to measure the flow of water into or out of laundry machine 102, an ammeter to measure the electrical usage of laundry machine 102, a motion sensor to detect motion of laundry machine 102, and/or a moisture detector to detect moisture in laundry machine 102 or on the contents of laundry machine 102. Information provided by sensor 150 may allow controller 120 to determine the operational state of laundry machine 102.

In various embodiments, laundry management system 100 may comprise a timer that times the duration laundry machine 102 has been running. In that regard, the timer may know how long a laundry cycle has been going, and if the cycle length is known, the timer may indicate how much time is left in a cycle. For example, a user may select a 60-minute cycle, and at after 45 minutes have passed, detected by the timer, the timer and/or controller 120 may determine that 15 minutes remain in the cycle. Accordingly, the timer and/or sensor 150 may be used to determine the operational state of laundry machine 102 (i.e., whether the laundry machine 102 is operating, cycle complete, how long until a cycle completes, time lapsed after cycle complete, or the like). In various embodiments, the timer may be comprised as part of sensor 150. In various embodiments, laundry management system 100 may not comprise sensor 150, but may have a timer to detect the operational state.

In various embodiments, laundry management system 100 may comprise a remote messaging device 140 configured to send one or more messages to a remote communication device associated with the user, such as a cell phone, pager, computer, or the like. A message may be sent for the purpose of communicating information regarding the operational state of laundry machine 102 to a user (which may be detected by sensor 150 and/or the timer) and/or for the purpose of testing message transmission to the remote communication device. Remote messaging device 140 may be configured to send a message to the remote communication device in response to the laundry cycle being complete (i.e. cycle complete). Remote messaging device 140 may be configured to send a message to the remote communication device in advance of laundry cycle completion and/or which advises a user of an estimated time to completion. Remote messaging device 140 may be configured to send a message to the remote communication device to provide updates on an elapsed time after cycle complete.

With continued reference to FIG. 1, remote messaging device 140 may be in communication with controller 120. Remote messaging device 140 may be configured to send SMS (short messaging service) messages, text messages, emails, or other communications to a remote communication device. In various embodiments, remote messaging device 140 comprises a modem, such as a global system for mobile communication modem. Remote messaging device 140 may send messages via any suitable communication medium, such as via the Internet, bluetooth, near-field communication, or the like. However, remote messaging device 140 may comprise any device suitable for sending a message to user's remote communication device.

In various embodiments, in response to sensor 150 and/or the timer detecting a laundry machine operational state of cycle complete (i.e., the laundry cycle is complete), controller 120 may command remote messaging device 140 to send a message to a user's remote communication device advising of the status. In various embodiments, in response to sensor 150 detecting a laundry machine operational state of cycle complete, controller 120 may command remote messaging device 140 to send a message after a predetermined time period, such as a grace period. In that regard, the timer comprised in laundry management system 100 may be configured to keep track of different time periods before, throughout, and/or after a laundry cycle by laundry machine 102. The grace time period may comprise 5 minutes, 10 minutes, or any suitable amount of time, for which the timer may begin upon sensor 150 detecting that the cycle of laundry machine 102 is complete.

In various embodiments, in response to sensor 150 and/or the timer detecting an operational state of laundry machine 102, controller 120 may calculate an estimated time to cycle complete status, and controller 120 may command remote messaging device 140 to send a message advising a user of the estimated completion time. In various embodiments, a user may input the desired timing to receive a message during the laundry cycle from messaging device 140 (i.e., a pre-determined time before cycle complete). For example, a user may know that she will be 15 minutes away from laundry machine 102. Therefore, she may input the pre-determined time (15 minutes) into user interface 110 so that remote messaging device 140 sends a message to the user's remote communication device 15 minutes prior to the completion of laundry machine's 102 cycle. In such a case, sensor 150 and/or timer may detect an operational state indicating that laundry machine 102 is 15 minutes from completing the laundry cycle, and in response, remote messaging device 140 may send a message to the user's remote communication device advising that the laundry cycle will be complete in 15 minutes.

In various embodiments, laundry management system 100 may comprise a payment mechanism 160 configured to receive payment from a user for use of laundry machine 102. Payment mechanism 160 may be in communication with controller 120. In various embodiments, payment mechanism 160 may be configured to receive physical currency such as paper currency and coins. Payment mechanism 160 may comprise at least one of a magnetic strip and/or card reader, an RFID chip reader, a paper bill collector, a room key reader, and a coin collector. In that regard, payment mechanism 160 may be configured to receive a payment instrument such as a credit or debit card, hotel or cabin room key, proximity card, electronic payment token, electronic funds transfer, or the like. In various embodiments, payment mechanism 160 may be configured to facilitate transfer of electronic currency or funds from a user's account to an account associated with laundry machine 102. Payment mechanism 160 may comprise a controller and/or interface independent of controller 120 and/or user interface 110. In various embodiments, a cabin or a hotel room key card may be used with a pin number to charge the room number directly.

In various embodiments, the payment received may be for standard laundry machine use and/or may be for additional charges resulting from a user's belongings remaining in laundry machine 102 after the laundry cycle is complete and/or after a grace period has expired (i.e., an overdue payment). As an example, a user may submit payment to payment mechanism 160 in order to start use of laundry machine 102. Such a standard use payment may be required to open laundry machine 102 after the laundry cycle is complete, in various embodiments. Upon completion of the laundry cycle of laundry machine 102, the timer may keep track of a grace period by counting down from, or up to, the amount of time of the grace period. The grace period may be a period of time following laundry machine 102 reaching cycle complete during which the user will not be charged additional money for not opening laundry machine 102 to retrieve the contents. If a user does not open laundry machine 102 to retrieve the contents of laundry machine 102 within the grace period (e.g., five minutes from completion of laundry cycle), the timer may keep track of how much time in addition to the grace period has lapsed, and laundry management system 100 may require the user to submit an overdue payment amount in order to open laundry machine 102 to retrieve the contents. The overdue payment may be calculated by controller 120 based on the time elapsed after the grace period expiration (e.g., an additional charge per minute after the grace period). In various embodiments, the grace period may be zero (i.e., there is no grace period, such that the user is required to open laundry machine 102 immediately upon, or before, cycle complete).

In various embodiments, laundry management system 100 may require a maximum payment encompassing both the standard use fee and the maximum overdue payment amount. Subsequently, if the user timely returns to retrieve laundry after cycle complete (i.e., within the grace period provided after cycle complete), any amount of the maximum payment may be returned to the user. If the user incurs some overdue payment amount, but less than the maximum payment, any remainder may be returned to the user. If the user leaves the laundry in laundry machine 102 well after cycle complete such that the charges meet or exceed the maximum payment, no funds will be returned to the user in response to the user retrieving the laundry.

In various embodiments, controller 120 may be configured to detect that the payment due has been received by payment mechanism 160. In various embodiments, controller 120 may command laundry machine lock 130 to switch to the unlocked position in response to receipt of the due payment. If the user opens or enters the identifier to open laundry machine 102, or otherwise indicates the user's presence at laundry machine 102 after cycle complete, within the grace period, no overdue payment amount is required. The only payment in such a case would be the standard use fee paid either before the laundry cycle begins or after the cycle ends (or to end the cycle and retrieve laundry prematurely).

In various embodiments, any or all components of laundry management system 100 may be integral to laundry machine 102. For example, user interface 110, controller 120, laundry machine lock 130, remote messaging device 140, sensor 150, and/or payment mechanism 160 may be integrated into laundry machine 102, or any or all of such components may be external to laundry machine 102. Laundry machine 102 may comprise its own processor and/or controller, which may allow laundry machine 102 to communicate electronically with any components of laundry management system 100, or any other systems, external to laundry machine 102. In various embodiments, a pre-existing laundry machine 102 may be retrofit to include any or all components of laundry management system 100.

Figure 2:
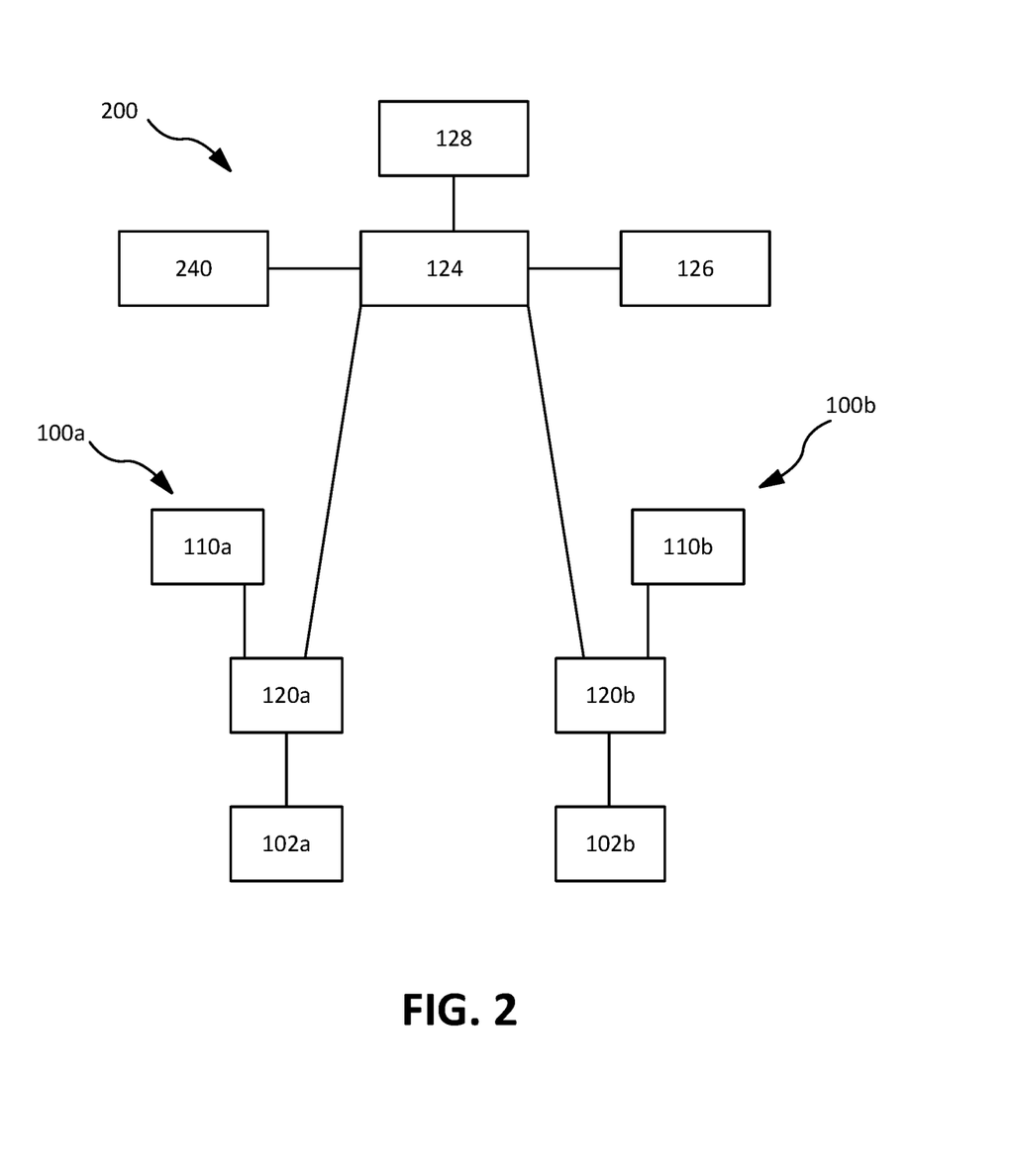
FIG. 2 illustrates a schematic view of an example multi-machine laundry management system, in accordance with various embodiments.

In accordance with various embodiments, FIG. 2 illustrates a multi-machine laundry management system 200 comprising multiple laundry management systems 100a and 100b (examples of laundry management system 100 depicted in FIG. 1). With combined reference to FIGS. 1 and 2, system 200 may comprise any desired number of laundry management systems 100, for example, two laundry management systems 100a and 100b. Each laundry management system 100a, 100b may comprise a laundry machine 102a, 102b, respectively, along with any or all of the other components of laundry management system 100 in FIG. 1 (user interface 110, controller 120, laundry machine lock 130, remote messaging device 140, sensor 150, and/or payment mechanism 160). As depicted in FIG. 2, laundry management systems 100a and 100b also comprise a user interface 110a and 110b, and a controller 120a and 120b, respectively. As described herein, in various embodiments, user interfaces 110a and 110b, and/or controllers 120a and 120b, and/or any or all of the other components of laundry management system 100, may be integral with laundry management systems 100a and 100b, respectively.

In various embodiments, controllers 120a and 120b may be autonomous, in that each controller 120a and 120b comprises the information, instructions, and processor necessary to implement and execute the various functions to operate laundry management systems 100a and 100b, respectively, and their respective components. In various embodiments, a main server 128 may be in electronic communication with controllers 120a and 120b, and may serve as a backup to controllers 120a and 120b should controllers 120a and 120b malfunction. In that regard, main server 128 may comprise a main processor capable of processing information similar to controllers 120a, 120b. Under circumstances in which controllers 120a, 120b are not functioning properly, main server 128 may execute operations of laundry management systems 100a, 100b to maintain proper function. Main server 128 may be in communication with controllers 120a and 120b through a data switch 124, which receives information and/or instructions from various sources (e.g., main server 128) and distributes the information and/or instructions to various locations (e.g., controllers 120a and 120b).

In various embodiments, controllers 120a and 120b may be without memory and/or instructions to execute the various functions of laundry management systems 100a and 100b (i.e., controllers 120a and 120b may not be autonomous). Instead, controllers 120a and 120b may be capable of receiving instructions from main server 128, and executing such instructions, and/or receiving information from the user through user interface 110a, 110b, respectively, for each laundry management system 100a, 100b and transmitting the information to main server 128 for processing and further action.

In various embodiments, controllers 120a, 120b may cause messages to be sent to main server 128 comprising data indicating the operational states of the respective laundry machines 102a, 102b. For example, controller 120a may determine, by analyzing an operational state detection by a sensor 150 in laundry management system 100a, that laundry machine 102a is in a cycle. Therefore, controller 120a may send such information regarding operational state to main server 128. Additionally, controller 120b may determine, by analyzing an operational state detection by a sensor 150 in laundry management system 100b, that laundry machine 102a is unlocked and not in use. Therefore, controller 120a may send such information regarding operational state to main server 128. Main server 128 may compile information from all laundry management systems with which it is in communication, and cause the information to be presented to potential users on a webpage or other display. For example, a laundromat, or other multi-machine laundry establishment, may use the operational state information to display which or how many laundry machines 102 are available at a given time, or in real time.

In various embodiments, along similar lines, the messages sent from laundry management systems 100a, 100b to main server 128 may comprise operational information indicating when a laundry machine 102a, 102b, respectively, is predicted to become available. For example, if the sensor 150 and/or timer of laundry management system 100a detects that the cycle of laundry machine 102a may be complete in 15 minutes, controller 120a may send such operational information to main server 128, which may cause such information to be presented, indicating that laundry machine 100a may become available in 15 minutes. In this regard, future users of laundry machines 102a, 102b, and any other laundry machines 102 in multi-machine laundry management system 200 may be able to see when the laundry machines 102 are busy, or when is a good time to possible get a laundry machine 102 to use. Similarly, in various embodiments, main server 128 may provide a user interface on a webpage, mobile application, or the like, that may allow a user to reserve a laundry machine 102. A user select to reserve a laundry machine 102 not in use. In response, controller 120 may command laundry machine lock 130 to actuate into the locked position. The user may provide an identifier through the user interface provided by main server 128, which the user may use to unlock laundry machine 120 when user goes to use laundry machine 102. Controller 120 may determine the amount of time for which the user reserved laundry machine 102 (e.g., via the timer), and may calculate a reservation fee based on that amount of time.

In various embodiments, system 200 may comprise a database 126 in electronic communication with controllers 120a and 120b, which may be through data switch 124. Database 126 may store identifiers received by controllers 120a and 120b from users, and other information such as confirmations that messages were sent to the user, or the like. Additionally, database 126 may monitor controllers 120a, 120b to make sure they are functioning properly. In various embodiments, database 126 may be comprised in and/or integral with main server 128, and/or main server 128 may execute the functions of database 126 previously discussed.

In various embodiments, a main messaging device 240 may be in electronic communication with controllers 120a and 120b, which may be through data switch 124. In various embodiments, remote messaging device 140 associated with each of laundry management systems 100a and 100b may be capable of sending messages to a remote communication device belonging to a user. In various embodiments, main messaging device 240 may serve as a backup to remote messaging device 140 of each laundry management systems 100a and 100b. In various embodiments, main messaging device 240 may produce and/or provide messages to each remote messaging device 140. The message content and timing of when the message is sent may depend on the operational state or on the predetermined time during a laundry cycle (e.g., send message 5 minutes before cycle complete). For example, in response to a cycle of laundry machine 102a ending, main messaging device 240 may provide and/or produce a message to the remote messaging device 140 of laundry management system 100a to send to the user that the cycle has ended and/or the grace period of a certain duration has begun. In various embodiments, main messaging device 240 may send messages directly to the user's remote communication device, thus reducing the need for local messaging from each respective remote messaging device 140. In various embodiments, the remote messaging device 140 of laundry management system 100a may comprise and/or produce standard messages independently, by, for example, instructions and execution provided by controller 120a.

In various embodiments, there may be one controller 120, or one of any other component of laundry management system 100, shared between two laundry management systems (e.g., laundry management systems 100a and 100b).

Figure 3:
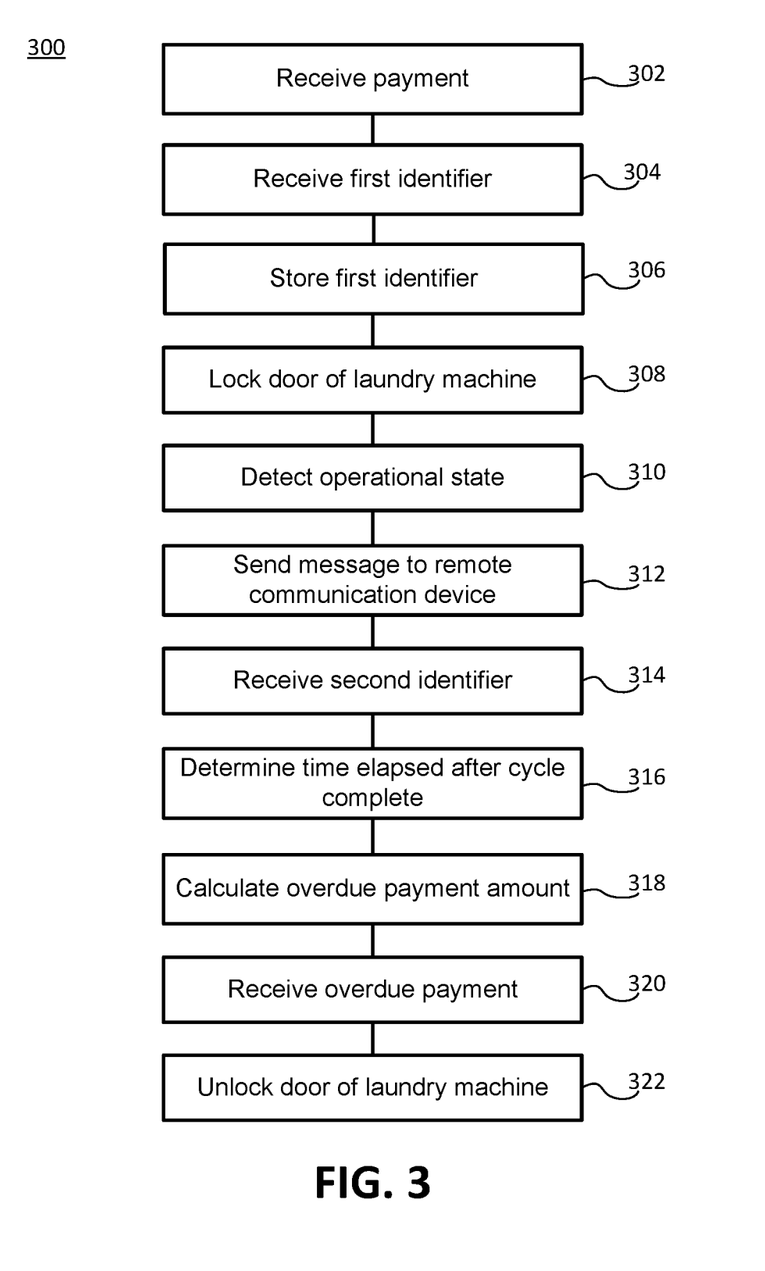
FIG. 3 illustrates an example method for using and operating a laundry management system, in accordance with various embodiments.

With respect to FIG. 3, the process flow depicted is merely an example of various embodiments, and is not intended to limit the scope of the disclosure. For example, the steps recited in any of the method or process descriptions may be executed in any order and are not limited to the order presented. It will be appreciated that the description herein makes appropriate references not only to the steps depicted in FIG. 3, but also to the various system components as described above with reference to FIGS. 1 and 2.

In various embodiments, a method 300 for use and operation of a laundry management system is depicted in FIG. 3, in accordance with various embodiments. With combined reference to FIGS. 1-3, method 300 may be described herein in relation to a single laundry management system 100, but may also be implemented in a multi-machine laundry management system 200. In various embodiments, method 300 may comprise receiving, by controller 120, a payment (step 302) from a user. The user may submit payment through payment mechanism 160, which may accept cash or electronic payment via a payment instrument (e.g., credit or debit card, pre-paid or charge card, hotel/cabin room key card, payment token, electronic funds transfer, or the like). Before or after receiving the payment, controller 120 may request a first identifier from the user by producing a request display on user interface 110. The first identifier may be any identifier which identifies the user and/or a remote communication device associated with the user (e.g., an identification code, pin number, name, phone number, email address, physical address, biometric information (e.g., fingerprint, face scan), or the like). The user may input the first identifier through user interface 110 and controller 120 may receive the first identifier (step 304). In one example embodiment, the user may use a hotel/cabin room key card and a pin number to charge their room/cabin number directly. Laundry management system 100 and/or controller 120 may store the first identifier (step 306) in a tangible, non-transitory memory configured to communicate with a controller. The memory may be comprised in laundry management system 100, or in another system in electronic communication with laundry management system 100 (e.g., database 126 and/or main server 128).

The user may have placed laundry into laundry machine 102. In response to receiving the first identifier and/or receiving payment to use the laundry machine 102, controller 120 may actuate laundry machine lock 130 to move into a locked position, i.e., lock the door of laundry machine 102 (step 308) such that a door of laundry machine 102 cannot be opened. In various embodiments, the door of laundry machine 102 may be locked by controller 120 energizing a solenoid, or any other mechanical and/or electromechanical locking device.

In various embodiments, the user may provide a device identifier associated with the user's remote communication device, such as a phone number, via user interface 110 to laundry management system 100. Before starting a cycle, laundry management system 100, via remote messaging device 140, may send the user a confirmation message on the remote communication device. Laundry machine 102 may lock and/or start a cycle in response to receiving a confirmation input from the user through user interface 110, which may be offered on the user's remote communication device. In various embodiments, a user may pay through the communication between laundry management system 100 and the user's remote communication device, or complete other functions like lock or unlock laundry machine 102.

In various embodiments, sensor 150 and/or the timer may detect an operational state (step 310) of laundry machine 102. For example, sensor 150 and/or the timer may detect that laundry machine 102 is in the middle of a cycle. As another example, sensor 150 and/or the timer may detect that laundry machine 102 is a pre-determined time or duration prior to cycle complete. The pre-determined time may be determined by controller 120, and/or the user may input the pre-determined time into user interface 110 so that the user may receive a message advising that laundry machine 102 will complete the cycle in the pre-determined time. As yet another example, sensor 150 and/or the timer may detect that laundry machine 102 has completed the cycle. Based on the operational state detected by sensor 150, controller may determine the operational state as, for example, a pre-determined time prior to cycle complete, at cycle complete, past cycle complete, and/or the like.

In response to detecting an operational state, in various embodiments, controller 120 may command sending of a message to a remote communication device (step 312) associated with the user and/or the first identifier, and remote messaging device 140 may send the message. For example, in response to the pre-determined time from cycle being reached, controller 120 may cause remote messaging device 140 to send a message to the user remote communication device that laundry machine 102 will complete the cycle in the pre-determined time, or the message may be sent by main messaging device 240. The user may then accordingly plan his or her return to laundry machine 102 to retrieve the contents. As another example, in response to laundry machine 102 reaching cycle complete, and sensor 150 detecting same, controller 120 may command remote messaging device 140 to send a message to the user's remote communication device advising of the completed cycle. Messages may also comprise notice that a grace period after cycle complete has elapsed, and/or how much extra time has elapsed after cycle complete for which the user will have to pay an overdue payment amount. The messages sent to the user may comprise any desired contents.

In various embodiments, when a user want to retrieve the contents of laundry machine 102, whether in the middle of a cycle or after cycle complete, the user may input a second identifier into user interface 110, and controller 120 may receive the second identifier (step 314). Controller 120, or another system internal or external to laundry management system 100, may compare the second identifier to the stored first identifier received before the laundry cycle began. In response to the second identifier matching the first identifier, controller may actuate laundry machine lock 130 to move to an unlocked position so the user may access the contents of laundry machine 102, i.e., unlock the door of laundry machine 102 (step 322).

In various embodiments, the user may be required to make payment in order for laundry machine 102 to be unlocked (step 322). For example, laundry management system 100 may not require payment before beginning a laundry cycle. Accordingly, if a user wishes to retrieve the contents of laundry machine 102, the user may submit the payment for use of laundry machine 102, and controller 120 may receive the payment (step 302).

In various embodiments, laundry management system 100 may require a user to unlock laundry machine 102 and retrieve the contents at a certain time (e.g., immediately upon laundry machine 102 reaching cycle complete, or within a grace period after cycle complete). In various embodiments, controller 120 may determine the time elapsed after laundry machine 102 reaches cycle complete (step 316), e.g., by keeping track using a timer. Controller 120 may use a timer to count down from, or count up to, a grace period time duration, and subsequently keep track of time elapsed. Controller 120 may stop keeping track of time elapsed after laundry machine 102 reaches cycle complete in response to the user indicating to controller 120 that the user has returned to laundry machine 102. Such an indication may be the user inputting the second identifier into user interface 110. Therefore, controller 120 may stop keeping track of time elapsed after laundry machine 102 reaches cycle complete in response to receiving the second identifier. In various embodiments, controller 120 may calculate an overdue payment amount (step 318) based on the time elapsed after laundry machine 102 reached cycle complete. For example, if five minutes elapsed after the grace period, and there is an overdue charge of two dollars per minute after the grace period, the user would owe an overdue payment amount of ten dollars. If there is no grace period after laundry machine reaches cycle complete, user may owe an overdue payment for all time elapsed after cycle complete. Controller 120 may command remoted messaging device 140 to send periodic message to the user's remote communication device to update the user on time elapsed after cycle complete, and/or how much the overdue payment amount is/will be.

In various embodiments, user may submit the overdue payment amount before or after inputting the second identifier. Overdue payment amount may be submitted via payment mechanism 160, and controller 120 may receive the overdue payment. Under circumstances in which an overdue payment amount is required, controller 120 may command laundry machine lock 130 to unlock the door of laundry machine 102 in response to receiving the overdue payment and/or receiving the second identifier.

The operations of laundry management system 100 discussed herein allow users to keep their laundry safely locked in laundry machine 102, which can be unlocked by an identifier associated with the user. Additionally, the user may be kept apprised of the operational state of laundry machine 102 one or more times during a laundry cycle, and of time elapsed after cycle complete. Further, laundry management system 100 may not allow users to occupy a laundry machine 102 simply by neglecting to retrieve their laundry without paying an overdue payment amount, so profit is not lost by being unable to reuse various laundry machines 102 because they are occupied for extended periods of time.

Figure 4:
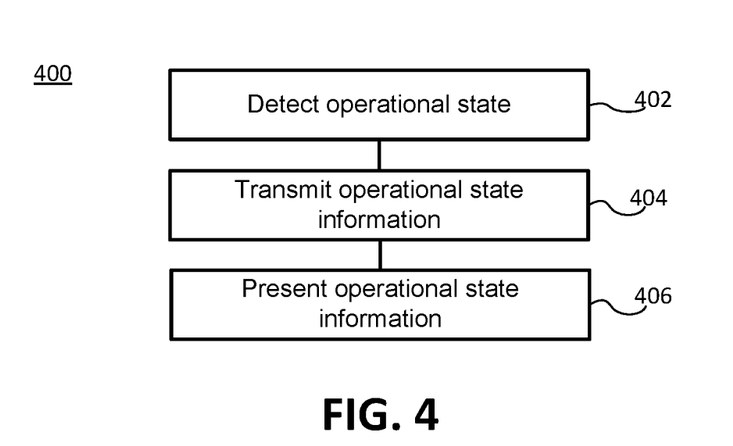
FIG. 4 illustrates an example method for presenting operational state information, in accordance with various embodiments.

A method 400 for presenting operational state information is depicted in FIG. 4, in accordance with various embodiments. With combined reference to FIGS. 1, 2, and 4, method 400 may comprising detecting an operational state (step 402) of a laundry machine 102 in a multi-machine laundry management system 200 (e.g., laundry machine 102a and/or 102b). The operational state may be detected by a sensor 150 comprised in each laundry management system 100 (e.g., laundry management systems 100a, 100b), or a sensor 150 in electronic communication with multiple laundry management systems 100. Controller 120 may determine the operational state of each laundry machine 102 based on the detection by sensor 150, and transmit the operational state information (step 404) to a main server 128. Main server 128 may receive the operational state information, compile it with other operational information for other laundry machines 102, and/or cause the operational information to be presented or displayed for users or potential users to view. For instance, the operational information may be presented or displayed (step 406) on a webpage or mobile application indicating which and/or how many laundry machines 102 in an establishment are available at any time, or in real time.

In various embodiments, the operational information may indicate when one or more machines in multi-machine laundry management system 200 may become available. For example, a sensor 150 and/or timer in each laundry management system 100, or main controller 128, may detect the operational status of a laundry machine 102, and how much time is left in a current cycle. Such operational information may be transmitted to main server 128, which may cause such information to be displayed. Therefore, users may be able to see when various laundry machines 102 may become available, in addition to which are currently available, and which are in use. Users, in various embodiments, may also reserve a laundry machine 102 through the webpage and/or main server 128, as described herein.

While several illustrative applications have been described, many other applications of the presently disclosed techniques may prove useful. Accordingly, the above-referenced arrangements are illustrative of some applications for the principles of the present invention. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments, and that numerous modifications can be made without departing from the principles and concepts disclosed herein.

In describing the present invention, the following terminology will be used: the singular forms "a," "an," and "the" include plural referents unless the context clearly dictates otherwise, and plural references also include singular referents. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also to include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "includes," "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

In an example embodiment, a method for presenting operational state information of laundry machines comprises: detecting, by a first sensor, a first operational state of a first laundry machine; producing, by a first controller, first operational information indicating that the first operational state of the first laundry machine is available; detecting, by a second sensor, a second operational state of a second laundry machine; producing, by a second controller, second operational information indicating that the second operational state of the second laundry machine is in a laundry cycle; transmitting, by the first controller, the first operational information to a main server; transmitting, by the second controller, the second operational information to the main server; and causing, by the main server, a display of the first operational information and the second operational information for viewing.

I claim:

1. A laundry management system, comprising:
a laundry machine having a laundry machine lock configured to remain in a locked position at a completion of a laundry cycle;
a user interface coupled to the laundry machine and in communication with a controller, the controller in communication with the laundry machine lock, the laundry machine lock configured to lock in response to receiving an identifier from the user interface;
a remote messaging device in communication with the controller, the remote messaging device configured to communicate with a remote communication device;
at a timer in communication with the controller and configured to detect an operational state of the laundry machine, wherein the controller is configured to send the operational state of the laundry machine to the remote communication device; and
a payment mechanism in communication with the controller, the payment mechanism comprising a room key reader;
a tangible, non-transitory memory configured to communicate with the controller, the tangible, non-transitory memory having instructions stored thereon that cause the controller to perform operations comprising:
determining, by the controller and through the timer, that the operational state of the laundry machine is a predetermined time prior to cycle complete;
commanding, by the controller and through the remote messaging device, sending of a second message to the remote communication device advising of the predetermined time;
determining, by the controller through the timer, that the operational state of the laundry machine is cycle complete;
determining, by the controller and through the timer, that a grace period has elapsed since the determining that the laundry machine is cycle complete;
determining, by the controller and through the timer, a first time elapsed between the determining that the grace period has elapsed and the receiving the identifier;
calculating, by the controller, an overdue payment amount in response to the calculating the first time, wherein the overdue payment amount is based on the first time;
receiving, by the controller and through the room key reader, a payment from a room key for the overdue payment amount; and
actuating, by the controller, the laundry machine lock in response to receiving the payment.

2. A multi-machine laundry management system, comprising:
a first laundry management system of claim 1; and
a second laundry management system of claim 1, wherein the first laundry management system and the second laundry management system are in communication with a main server.

3. The laundry management system of claim 1, wherein the operational state selected from a group consisting of a duration until the laundry cycle is complete, the laundry cycle is complete, and a duration after the laundry cycle is complete.

4. A method of using a laundry management system, comprising:
receiving, by a controller, a first identifier associated with a remote communication device through a user interface;
storing the first identifier in a tangible, non-transitory memory configured to communicate with the controller in response to receiving the first identifier;
actuating, by the controller, a laundry machine lock to a locked position in response to the storing the first identifier;
detecting, by the controller and via a sensor, an operational state of a laundry machine;
commanding, by the controller, sending of a first message to the remote communication device through a remote messaging device advising of the operational state; subsequently
receiving, by the controller, a second identifier through the user interface;
actuating, by the controller, the laundry machine lock to an unlocked position in response to the receiving the second identifier and the second identifier matching the first identifier;
determining, by the controller, that the operational state of the laundry machine is a predetermined time prior to cycle complete;
commanding, by the controller, sending of a second message to the remote communication device advising of the predetermined time;
determining, by the controller, that the operational state of the laundry machine is cycle complete;
determining, by the controller, that a grace period has elapsed since the determining that the laundry machine is cycle complete;
determining, by the controller, a first time elapsed between the determining that the grace period has elapsed and the receiving the second identifier;
calculating, by the controller, an overdue payment amount in response to the calculating the first time, wherein the overdue payment amount is based on the first time; and
receiving, by the controller and through a payment mechanism, a payment from a room key for the overdue payment amount, wherein the payment mechanism comprises a room key reader.

* * * * *